US012118379B1

(12) United States Patent
Tikhomirov

(10) Patent No.: US 12,118,379 B1
(45) Date of Patent: Oct. 15, 2024

(54) SECURE PACKAGE INSTALLATION INTO A TARGET CONTAINER

(71) Applicant: Virtuozzo International GmbH, Schaffhausen (CH)

(72) Inventor: Pavel Tikhomirov, Moscow (RU)

( * ) Notice: Subject to any disclaimer, the term of this patent is extended or adjusted under 35 U.S.C. 154(b) by 570 days.

(21) Appl. No.: 17/377,505

(22) Filed: Jul. 16, 2021

(51) Int. Cl.
*G06F 7/22* (2006.01)
*G06F 8/61* (2018.01)
*G06F 9/455* (2018.01)
*G06F 9/48* (2006.01)
*G06F 11/14* (2006.01)
*G06F 16/188* (2019.01)

(52) U.S. Cl.
CPC ............ *G06F 9/45558* (2013.01); *G06F 8/61* (2013.01); *G06F 9/4881* (2013.01); *G06F 11/1451* (2013.01); *G06F 11/1458* (2013.01); *G06F 16/196* (2019.01); *G06F 2009/45562* (2013.01); *G06F 2009/4557* (2013.01); *G06F 2201/84* (2013.01)

(58) Field of Classification Search
CPC ...... G06F 9/45558; G06F 8/61; G06F 9/4881; G06F 11/1451; G06F 11/1458; G06F 16/196; G06F 2009/45562; G06F 2009/4557; G06F 2201/84
See application file for complete search history.

(56) References Cited

U.S. PATENT DOCUMENTS

| | | | | |
|---|---|---|---|---|
| 11,010,259 | B1* | 5/2021 | Geng | G06F 11/1469 |
| 11,018,899 | B1* | 5/2021 | Melkild | G06F 8/60 |
| 11,216,566 | B1* | 1/2022 | Monakhov | G06F 21/78 |
| 11,397,588 | B2* | 7/2022 | Hudson | G06F 9/4416 |
| 2015/0242283 | A1* | 8/2015 | Simoncelli | G06F 11/1456 711/162 |
| 2018/0293374 | A1* | 10/2018 | Chen | G06F 9/45558 |
| 2019/0294461 | A1* | 9/2019 | Woods | G06F 16/14 |
| 2022/0309041 | A1* | 9/2022 | Whitechapel | G06F 8/61 |

* cited by examiner

Primary Examiner — Kevin L Young
Assistant Examiner — Abdou K Seye

(57) ABSTRACT

Techniques for secure package installation into a target container are described. The described techniques utilize a temporary service container to execute files for installation of a package into a target container. The service container provides an execution environment that is at least partially isolated from a host system and thus package file execution within the service container reduces vulnerability of the host system to potentially unsecure files and processes that may result from file execution.

17 Claims, 13 Drawing Sheets

SECURE PACKAGE INSTALLATION INTO A TARGET CONTAINER

BACKGROUND

Containers are utilized to provide virtual execution environments for a variety of computing purposes, such as to provide execution environments that are isolated from other portions of a host computing system. A container, for instance, can be utilized to execute applications and other processes from within a virtual execution environment that runs on an operating system of a host system and that is provided with controlled access to a subset of resources of the host system. To enable an application to be installed and executed within a container (e.g., without user involvement), typical container implementations utilize an installation process that is executed from within the context of a host system. Such implementations, however, may expose a host system to security vulnerabilities from untrusted and/or unsafe processes such as executable scripts and binaries utilized as part of the application installation process.

SUMMARY

Techniques for secure package installation into a target container are described. The described techniques utilize a temporary service container to execute package files (e.g., installation scripts) for installation of a package into a target container. The service container provides a virtual execution environment that is at least partially isolated from a host system and thus package file execution within the service container reduces vulnerability of the host system to potentially unsecure files and processes that may result from package file execution.

According to an exemplary method for secure installing a package into a container, a computing device can generate a temporary service container, wherein the temporary service container is located within the host operating system. Furthermore, the computing device can permit the temporary service container access to a container file system of a target container based on an access provisioning technique. The computing device can also initiate a package manager to execute package management operations. The package manager can execute a package management operation comprising executing one or more execution files, within the temporary service container, required for installing the package on the container file system, the container file system accessible by a temporary service container file system of the temporary service container. Also, the computing device can terminate the temporary service container based on a completion of installing the package within the temporary service container or in response to a command of the host operating system or of the temporary service container.

Exemplary aspects discussed herein include, for example, a method, implemented by at least one computing device, for secure installing a package into a target container, the method including the following steps; and/or a system for secure installing a package into a target container including one or more processors and one or more storage devices including processor executable instructions that, responsive to execution by the one or more processors, cause the system to perform operations including the following steps; and/or one or more computer-readable storage media storing instructions that are executable by a computing system to perform operations including the following steps; wherein the steps are: generating a temporary service container in a host operating system; permitting the temporary service container access to a container file system of the target container; initiating a package manager to execute, within the temporary service container, one or more executable files located on the container file system of the target container and required for installing the package on the container file system of the target container; and terminating the temporary service container based on a completion of installing the package, or in response to a command of the host operating system or of the temporary service container.

In different exemplary aspects, optional additions to the described herein methods and systems may be present. For example, in one aspect, the container file system is accessible by a temporary service container file system of the temporary service container. In one aspect, any of the following steps may be present: accessing, by the package manager, a network including a set of package files; and downloading a subset of package files of the set of package files to the container file system. In one aspect, the temporary service container is generated based on at least one of: a template including temporary service container parameters, a snapshot of a temporary service container, or a restore image of a temporary service container. In one aspect, any of the following steps may be present: starting a package manager process within the temporary service container, wherein the package manager process is configured to install, create, delete, or change a set of package files within the container file system of the target container; and/or configured to start, within the temporary service container, execution of the one or more executable files, wherein the one or more executable files are located on the container file system of the target container. In one aspect, a process, running on the host operating system and outside of the target container and outside of the temporary service container, upon a request from the temporary service container executes a command into the target container. In one aspect, generating the temporary service container and/or permitting the temporary service container access to a container file system of the target container further includes: mounting into the temporary service container a virtual block device created from a disk image of the target container. In one aspect, generating the temporary service container and/or permitting the temporary service container access to a container file system of the target container further includes: creating and setting up a mount namespace of the temporary service container so that the mount namespace of the temporary service container includes a copy of at least one mount from a mount namespace of the target container. In some aspects, generating the temporary service container and/or permitting the temporary service container access to a container file system of the target container further includes at least one of: mounting the container file system of the target container within a temporary service container file system of the temporary service container; bind-mounting a root directory of the container file system of the target container into a directory in a temporary service container file system of the temporary service container; getting a copy of a mount tree of the target container and relocating the copy as a subtree of a mount tree of the temporary service container; or creating a mount namespace of the temporary service container by copying a mount namespace of the target container, privatizing a set of mounts of the mount namespace of the temporary service container, mounting the temporary service container file system of the temporary service container into a new directory in the mount namespace of the temporary service container, and making the new directory to become a root directory of the mount namespace of the temporary service container simultaneously with moving a root directory of the container file system of the target container to a subdirectory of the new directory. In one aspect, generating the temporary service container and/or permitting the temporary service container access to a container file system of the target container further includes: creating a copy of mount tree of the target container into a mount namespace of the temporary service container.

Exemplary aspects discussed herein include, for example, a method, a system or a computer-readable storage media storing instructions for performing the following: generating a service container, with a package manager, and a target container file system mounted within the service container; executing, by the package manager within the service container, executable package management instructions for a package including to execute script file executable instructions; executing, based on execution of the script file executable instructions, a binary file accessed from the target container file system to cause installation of an application from the package to the target container via the target container file system; and terminating the service container based on completion of installation of the application to the target container, or in response to a command of the host operating system or of the temporary service container.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures.

DETAILED DESCRIPTION

Overview

Figure 1:
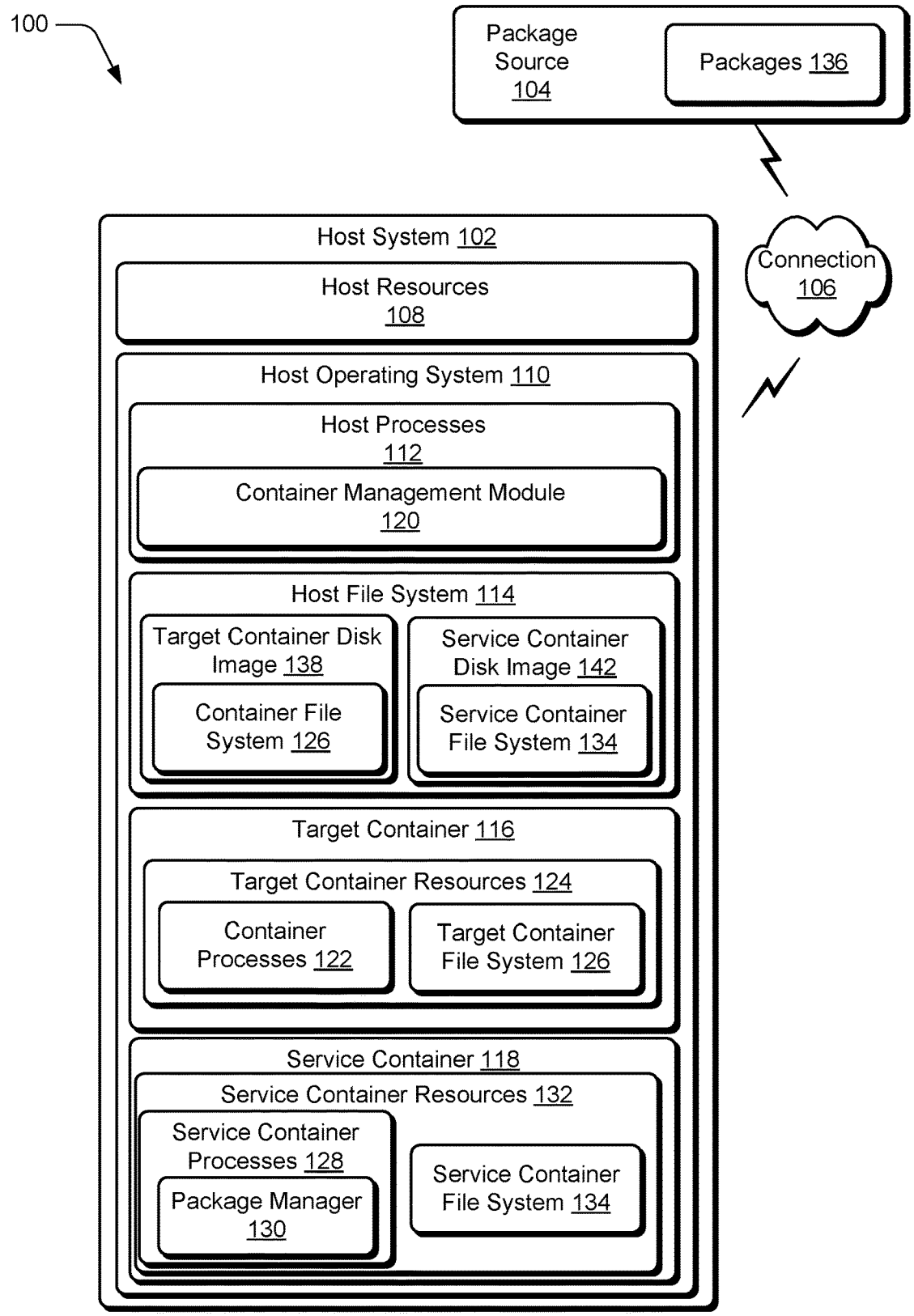
FIG. 1 is an illustration of an environment in an exemplary aspect that is operable to employ techniques described herein.

To overcome the security deficiencies in conventional package installation techniques, techniques for secure package installation into a target container are described. Generally, the described techniques provide for increased system security as part of package installation by reducing exposure of host system resources to potentially unsecure and/or malicious processes. In at least one exemplary aspect, an installation of a package may comprise installation, update, upgrade, removal, set up, applying, management, deinstallation, configuration, reconfiguration, and/or etc. of an application, package, service, daemon, driver, module, and/or etc. For instance, in response to an indication to install a package into a target container, an operating system of a host system instantiates a service container to manage the installation. Generally, the service container represents a specialized instance of a container that is generated and managed for package installation. In at least one exemplary aspect, the service container is temporary in that it is created for a package installation task and terminated after package installation.

In one exemplary aspect, a package manager that at least partially resides within the service container obtains a package for installation on the target container and writes package files from the package to a file system of the target container.

In one exemplary aspect, as part of generating the service container, the service container is provided with access to the file system of the target container. The service container executes the package files (e.g., installation scripts) to cause installation of the package into the target container. In at least one exemplary aspect, this includes initiating a script from the package files, which in turn may initiate execution of a binary file from the target container file system. The file execution is performed within the service container and thus resources of the host system are not exposed to potential unsecure scenarios (e.g., an exploit and/or other malicious behavior) that may result from execution of the package files or files residing on the target container file system (e.g., the host system may do not trust the files from a container file system because such files can be changed by a container user).

In one exemplary aspect, execution of the package files can cause package installation into the target container, such as for installing, updating, upgrading, managing, setting up, uninstalling or removing an/a set of application(s), library(ies) or a package(s), and so forth. These examples are presented for purpose of illustration only, and package installation can be utilized to perform a variety of different actions pertaining to a target container.

In one exemplary aspect, the service container may stop or be stopped (or ask the host OS to terminate the service container) upon completion of the installation (either successful or unsuccessful) or upon a command of a host OS or of the service container, or even of the user or a process of the target container. Thus, the described techniques provide for increased security for systems that host container environments. Accordingly, package installation may be completed, either successfully or unsuccessfully. For example, unsuccessful completion of installation may indicate that a problem occurred during package installation, such as corrupt and/or malicious package files, wrong package or package dependencies versions, a lack of resources, or etc. For instance, in one exemplary aspect, during package installation by a service container, an installation timer maintained by a host operating system or by the service container may elapse. This helps the system to be ready to handle unexpected situations and may indicate that a problem occurred during package installation, such as based on corruption and/or execution of malicious package files, not responding processes, or etc. Accordingly, in one exemplary aspect, in response to expiration of the installation timer, the service container is terminated and removed. In at least one exemplary aspect, the service container is terminated and removed in response to a termination command, such as from the host operating system or even from the service container itself. In at least one exemplary aspect, the service container may have an installation timer, and stop (or ask the host OS to terminate the service container) when the timer is elapsed.

In one aspect, the installation (or update, upgrade, remove, set up, manage, deinstall, reconfiguration, or etc.) of a package (or application, service, daemon, driver, module, package files, executable file, a compressed file, or etc.) may be performed to any possible target container. For example, the target container may be in any state: running, paused, stopped, or etc.; or the target container may have or not have packet managers, network access, running processes inside of it, etc. In one aspect, software in a target container is auto-updated, e.g., without involving the target container user. In one aspect, using any type/kind of package managers is allowed.

In one aspect, the following step may also be performed: running a package script or scripts. Wherein the script may be a pre- or post-trans scripts; may be performed at the beginning or at the end of a transaction; may perform and/or may perform a set up of the package, or other packages, or any files on the target container file system, or etc. The script may in its turn start execution of a binary or executable file from the target container file system.

In one aspect, the service container may include some of the target container's resources (e.g., mounts, target container file system). In at least one aspect, the service container has access to the target container file system.

In one aspect, an installation of a package may comprise installation, update, upgrade, removal, set up, applying, management, deinstallation, configuration, reconfiguration, and/or etc. of an application, package, service, daemon, driver, module, and/or etc.

In the following discussion, an example environment is first described that may employ the techniques described herein. Example scenarios and procedures are then described which may be performed in the example environment as well as other environments. Performance of the example procedures is not limited to the example environment and the example environment is not limited to performance of the example procedures. Finally, an example system and device are described that are representative of one or more computing systems and/or devices that may perform the various techniques described herein.

Example Environment

FIG. 1 is an illustration of an environment 100 in an exemplary aspect that is operable to employ secure package installation into a target container as described herein. The illustrated environment 100 includes a host system 102 and a package source 104 connected to one another via a connection 106. The package source 104 and the connection 106 are optional and may not be present in some exemplary aspects. Computing devices that are usable to implement the host system 102 and the package source 104 may be configured in a variety of ways, such as a hardware server, a computer, a desktop computer, a laptop computer, a mobile device (e.g., in a handheld configuration such as a tablet or mobile phone), a server device, and so forth. Further, a computing device may be representative of a plurality of different devices, such as, for example, distributed systems or multiple servers utilized to perform operations "over the cloud". An example of a computing device is further described in relation to FIG. 8.

The host system 102 includes various functionality to enable techniques for secure package installation into a target container described herein, including, for example, host resources 108 and a host operating system (OS) 110. The host resources 108 represents different instances of logical (e.g., processes, etc.) and physical (e.g., hardware) resources of the host system 102, such as resources utilized by the host system 102 for performing various computing tasks. The host OS 110 represents functionality for managing various operations of the host system 102. The host OS 110, for example, abstracts functionality of at least some of the host resources 108, such as to enable different processes executing on the host system 102 to access the host resources 108.

The host OS 110 includes host processes 112, a host file system 114, a target container 116, and\or a service container 118. The host processes 112 generally represent different processes executing on the host system 102 and for various purposes, such as for performing system functions, managing applications, enabling hardware access, and so forth. In one aspect, the host processes 112, for instance, represent instances of the host resources 108. In one exemplary aspect, the host processes 112 include a container management module 120, which represents functionality for performing and managing container functionality for the host system 102, such as creating, starting, managing, setting up, migrating, checkpointing, restoring, resuming, terminating, destroying, and\or stopping containers, and so forth. The container management module 120, for instance, represents functionality for at least instantiating and\or managing the target container 116 and\or the service container 118.

The host file system 114 represents a file system (or several file systems) maintained by the host OS 110 and for managing various file-related operations for the host system 102, such as how data is stored and retrieved for the host system 102.

The target container 116 generally represents a container created by the container management module 120 for various purposes, such as for providing a virtual execution environment for executing container processes 122. The target container 116 can be created for various purposes, such as for a particular user, for a particular application, and so forth. The container processes 122, for example, represent applications and other functionality that execute within the context of the target container 116. The target container 116 also includes target container resources 124 which is a subset of host OS resources 108 and, may in one exemplary aspect, include a target container file system 126 and/or target container processes 122. The target container resources 124 generally represent resources utilized by the target container 116 such as, for example, for execution of the container processes 122. In at least one exemplary aspect, the target container resources 124 represent a limited and controlled subset of the host resources 108. For example, target container processes 122 are a subset of host OS processes 112. The container file system 126 represents functionality for controlling how data is stored and retrieved for the target container 116.

Figure 2A:
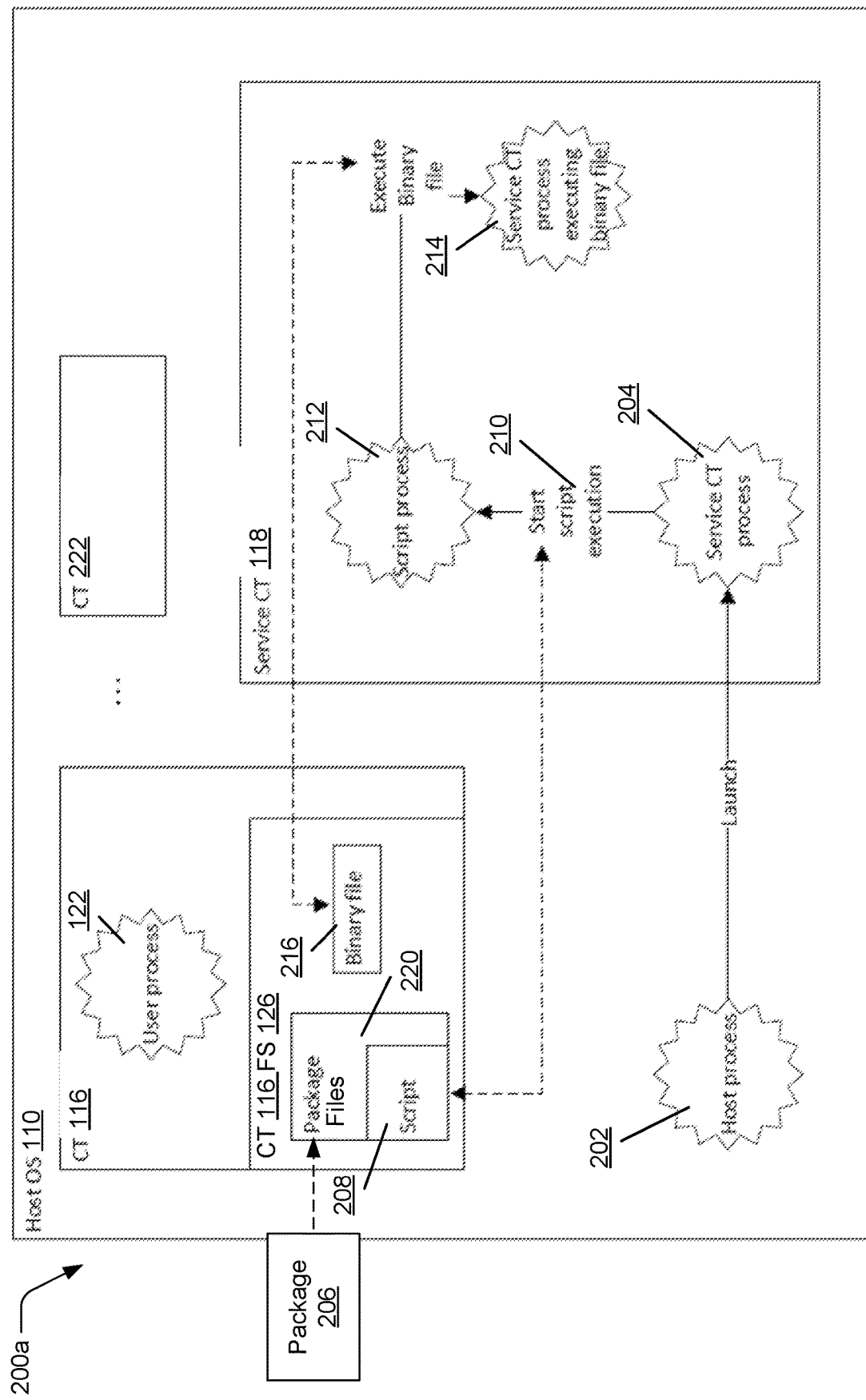
FIG. 2a depicts an example scenario illustrating exemplary aspects of secure package installation into a target container.

While the host system 102 is depicted here with a single target container 116, it is to be appreciated that through the container management module 120 the host OS 110 is able to generate and maintain multiple target containers 116, and any other containers like container 222 shown on FIG. 2a, concurrently on the host system 102.

In one aspect, the target container may be a system container, an application container, an isolated virtual execution environment, or etc. In one aspect, the service container may be a system container, an application container, an isolated virtual execution environment, or etc. In one aspect, the target container and the service container may be of the same type, and in another aspect, they may have different types.

The service container 118 represents a type of container that is generated to manage package installation (including installing, updating, upgrading, managing, setting up, removing, etc. of packages or applications) for the target container 116. In one exemplary aspect, the container management module 120 generates and maintains the service container 118 on a per-package, per-installation, or per-target container basis. In one exemplary aspect, a particular service container 118, for example, is temporarily created to manage installation of an instance of a package or of a set of packages and may be terminated upon completion of package installation and/or based on a termination command from the container management module 120. The service container 118 includes service container resources 132, which, in at least one exemplary aspect, may include a service container file system 134 and/or service container processes 128. In at least one exemplary aspect, the service container resources 132 represent a limited and controlled subset of the host resources 108. The service container 118 includes service container processes 128 which, in one aspect, may include processes of a package manager 130. The service container file system 134 represents functionality for controlling how data is stored and retrieved for the service container 118. As further detailed below, a variety of different techniques can be utilized for enabling the service container file system 134 to access and interact with the target container file system 126 for purposes of package installation.

A package manager 130 represents functionality for managing installation of packages on the target container 116. Generally, the package manager 130 represents a program, utility and/or module (or a set of programs) that performs installation, updates, deinstallation, management, and so forth of packages, applications, etc. In at least one exemplary aspect, the package manager 130 is a collection of software tools that automates the process of installing, upgrading, configuring, and removing computer programs for a computer's operating system. In at least one exemplary aspect, the package manager 130 can also be a module, which comprises several other package managers, each useful in different situations, e.g., for different operating systems or for different types of packages, etc. The package manager 130 can comprise one or more specific package managers (also called package-management system) used in different operating systems (e.g., non-limiting examples of the package managers include apt-get, aptitude, apt, dnf, etc. that are used in different Linux distributions, winget for Windows, and so forth). In at least one exemplary aspect, different distributions of the same operating system can run in a set of different containers on a host operating system (which also is a distribution of that operating system). In such examples, the operating system kernel is shared by all of the containers of the set of containers and a host package manager may include specific package managers for each of the distributions. In at least one exemplary aspect, a host package manager may select a proper package manager depending on the type of distribution in the user container, which needs an update and/or installation of a package.

In one exemplary aspect, the package manager 130 is a process or a set of processes, at least one of which is running inside of the service container and performing package installation. In one exemplary aspect, the package manager as a whole runs in the service container; in another exemplary aspect, the package manager partially (i.e., as at least one process) in the host OS, i.e., outside of the service container, and partially (i.e., as at least one process) inside of the service container. In one exemplary aspect, a part of the package manager may be in the target container.

In one exemplary aspect, to enable packages to be installed on the target container 116, the package manager 130 first obtains packages 136 from a package source 104. In some exemplary aspects, for example, a package source 104 is a part of the host system 102, is local to the host system 102, or remote from the host system 102 (e.g., a network package source). In some aspects, the package source 104 may be local or remote, may comprise a network package source, a local or a network storage, a distributed storage, a storage device, a set of package sources, or etc. In some aspects, the connection 106 may comprise a network (e.g., Network 209 on the FIG. 2b), a communication channel, a connection to a local or a network storage, or etc.

In one aspect, the package source 104, for instance, maintains (e.g., stores) packages 136 that are accessible to the host system 102. In one exemplary aspect, the package manager 130 is able to initiate retrieval of a package 206 (or a set of such packages) from the packages 136 (e.g., stored on the package source 104). In one exemplary aspect, the package manager 130 retrieves package files 220 from the package 206 and/or puts package files 220 to the target container file system 126 (e.g., via the service container file system 134, via host file system, or etc.).

In another one exemplary aspect, package files 220 may already be present on the target container file system 126 (in this exemplary aspect, steps of downloading and copying are omitted). In one exemplary aspect, package files 220 are utilized by a process (e.g., belonging to or initiated by the package manager 130, or the package manager 130 itself) running inside of the service container 118 to install packages to the target container 116. This enables package installation for the target container 116 to occur from within the context of the service container 118 and thus avoids exposing the host OS 110 and the host system 102 to potentially unsafe scenarios, e.g., such as an exploit that may occur in case of execution of files laying on target container file system 126.

In one exemplary aspect, the host file system 114 stores a target container disk image 138 that includes a container file system 126. The target container disk image 138, for instance, represents data of the target container 116. In at least one exemplary aspect, the target container file system 126 can be is modified based on package installation performed by the service container 118.

In one exemplary aspect, a virtual block device containing container (e.g., a target container, a service container, or etc.) file system may be created from a container disk image. In one aspect, a virtual disk, also called, virtual block device, may be created by the OS means and be represented, for example, by a file (e.g., a disk image, a loop block device (e.g., ploop)) on host file system (or on any underlying file system). In one exemplary aspect, a container (e.g., a target container, a service container, etc.) uses a mount to access a container file system. In one aspect, a mount may be considered as an interface to a file system.

The host file system 114 also stores a service container disk image 142 that includes a service container file system 134. The service container disk image 142 represents data of the service container 118, such as data utilized as part of execution and management of the service container 118. In at least one exemplary aspect, the service container disk image can be utilized to instantiate the service container 118, such as in response to an indication that the service container 118 is to be generated to perform package installation for the target container 116.

Having considered an example environment, consider now a discussion of some example details of the techniques for secure package installation into a target container in an environment in accordance with one or more exemplary aspects.

Details

The following discussion describes some different example scenarios for secure package installation into a target container. While the various actions in the scenarios are discussed in a particular order, it is to be appreciated that the actions can be performed in different orders than those depicted and at least some of the actions may be performed concurrently with one another.

FIG. 2a depicts an example scenario 200a illustrating exemplary aspects of secure package installation into a target container. In the scenario 200a, a host process 202 (e.g., the container management module 120 of the host processes 112, or a package manager 130 process, or a set of processes, etc.) starts the service container 118 and launches a service container process 204. The service container process 204 accesses the target container file system 126 of the target container 116 which contains package files 220 that include a script 208. The service container process 204 then performs a script execution action 210 to initiate a script process 212 to perform commands from the script, which may include starting execution (e.g., in a new process 214) of a binary file 216 from the target file system 126. While this example is discussed with reference to the target container 116, there may be any number of other target containers running in the system, such as the target container(s) 222.

In one exemplary aspect, the service process 204 in the service container 118 may need to start execution of a file (e.g., the binary file 216) from the target file system 126 to perform installation of a package. In this case, the execution is started in a process (e.g., 214, 212, or 204) inside of the service container. In some exemplary aspects, for example, step 210, script 208 and process 212 are optional.

Figure 2B:
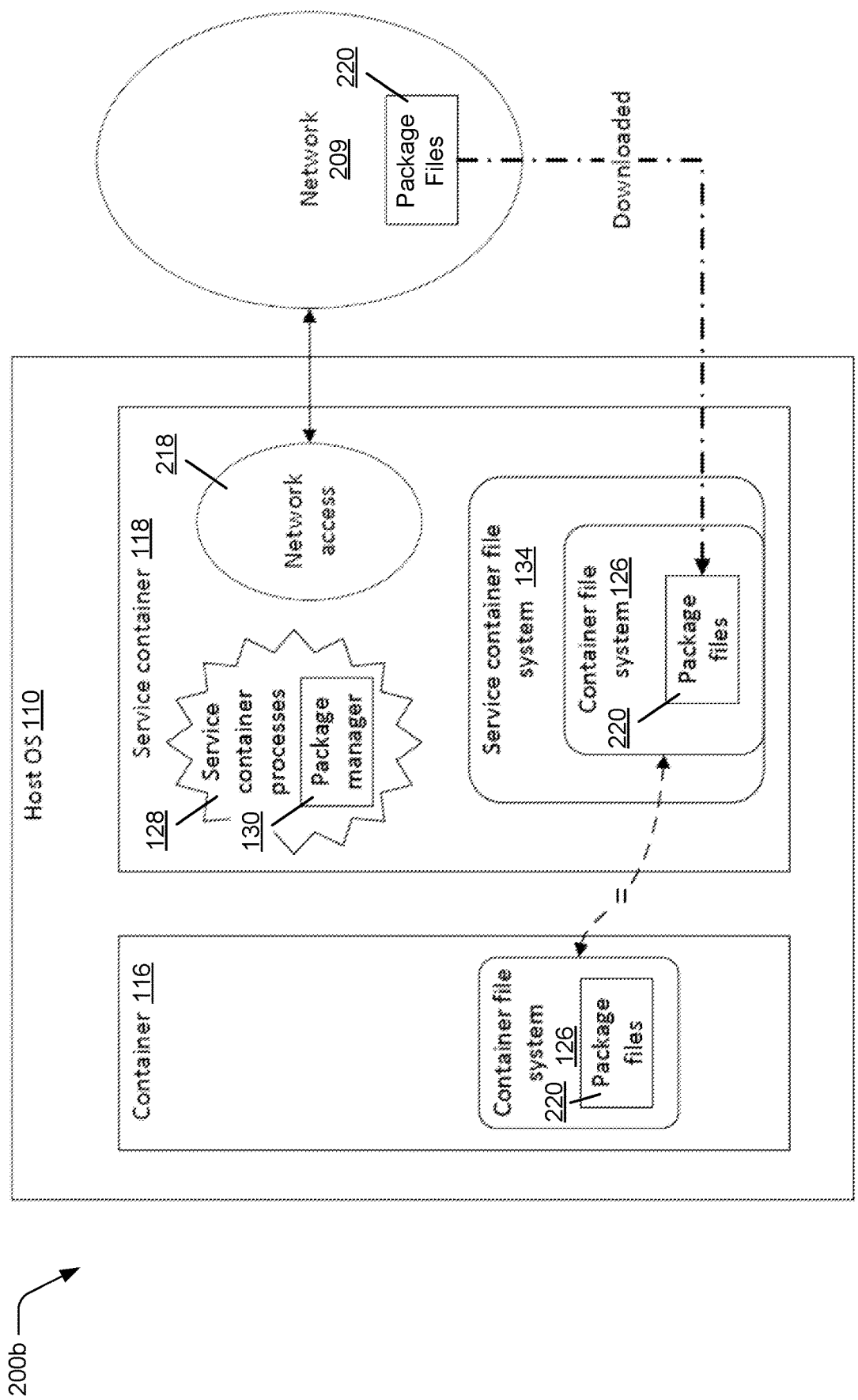
FIG. 2b depicts an example scenario illustrating a container file system access as part of secure package installation into a target container.

FIG. 2b depicts an example scenario 200b illustrating a container file system access as part of secure package installation into a target container. The service container 118 can execute the package files 220 and files from the target container file system 126 from within the context of the service container 118, such as detailed throughout this disclosure. In the scenario, the service container 118 obtains access to the container file system 126 and to the files on it via the service container file system 134. Example ways for enabling the service container 118 to access the container file system 126 are detailed below.

In one exemplary aspect of the scenario 200b any of the following optional steps may also be performed: using a network access 218 (e.g., provided by the host system 102) to download the package 206 over the network 209 (which is an example of the connection 106), such as, for example, from the network package source; retrieving package file 220 from the package 206 (e.g., unpacking, decompressing, decrypting, etc.); copying (e.g., by the package manager 130 process of the service container 118, or by host process, etc.) package files 220 to the container file system 126 of the target container 116; etc. In one aspect, the method may involve retrieving a package, or application files, or package files, or executable file, or a compressed file, etc. from the package source 104 via connection 106. In one aspect, corresponding dependencies of the package are retrieved (e.g., downloaded). For example, additional packages may be downloaded and/or installed in case where such packages are needed for successful installation of the package.

Figure 2C:
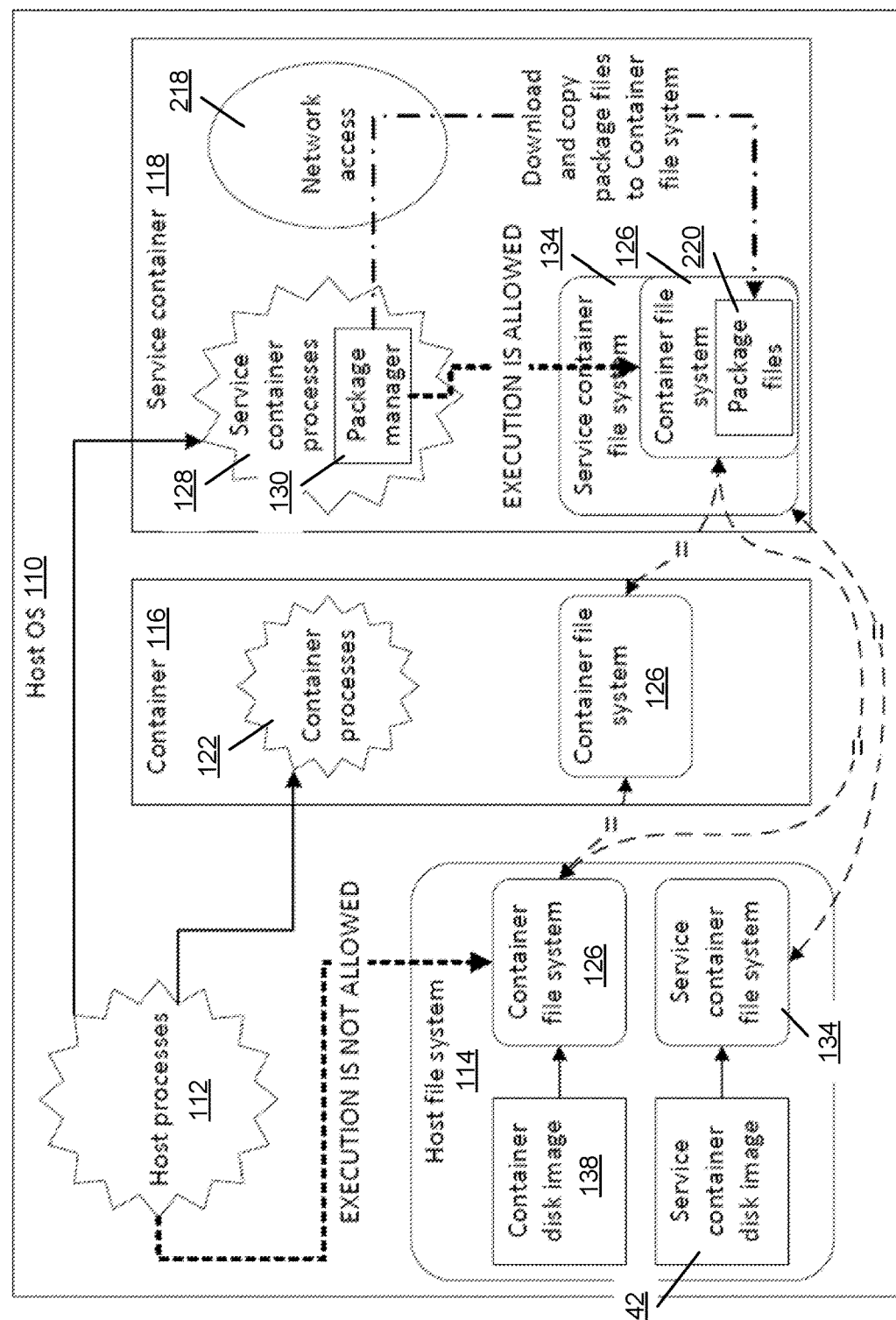
FIG. 2c depicts an example scenario illustrating secure package installation into a target container.

FIG. 2c depicts an example scenario 200c illustrating secure package installation into a target container. In the scenario 200c, the host system 102 includes the host OS 110, the target container 116, and the service container 118 used to perform package installation into the target container 116. Generally, a container have access to a limited subset of host resources of the host OS 110 (in one aspect, this is achieved, for example, by namespaces, control groups, and/or other kernel containerization primitives, etc.). The target container processes 122 and the service container processes 128, for instance, represent subsets of the host processes 112. Further, the host OS 110 has access to the host file system 114 and the host processes 112, such as the container management module 120. This enables the host OS 110 to start and/or create the service container 118 and give the service container 118 access to the container file system 126.

In the scenario 200c, the host file system 114 includes the target container disk image 138 and/or the target container file system 126 and the service container disk image 142 and/or the service container file system 134. The host file system 114 may optionally contain the container file system 126 and/or the service file system 134 in a separate directory. The host file system 114 may optionally contain virtual block devices (e.g., 224 for the target container and/or 264 for the service container), which may be created from the corresponding container disk images (e.g., 138 for the target container and 142 for the service container).

In the scenario 200c, the target container file system 126 of the target container is accessible by the target container 116; by the host OS as a part of host file system 114; and by the service container 118 as part of the service container file system 134 of the service container 118. A service container process (or processes) running inside of the service container 118 (e.g., the package manager 130, or a process initiated by or belonging to the package manager, etc.) that performs a package installation has access to the container file system 126 and, accordingly, to the package files 220 at the container file system 126. Therefore, changes to the target container file system 126 performed by the service container process (or processes) inside of the service container 118 during a package installation will be available to the target container 116 and, thus, the package will be installed into the target container 116. Moreover, the service container process may initiate, inside of the service container, execution of a file form the target container file system 126 in case when such execution is needed for performing installation. Such execution will be secure for the host OS because it is performed inside of the service container. Generally, this enables a process in the service container 118 to install an application, inside of the service container 118, into a directory belonging to the target container file system 126. In one aspect, such changes will automatically be reflected to the target container file system 126 inside of target container 116 and the installation will be performed for the target container 116.

The scenario 200c, may comprise additional optional steps. For example, in one exemplary aspect of the scenario, the service container 118 may have network access 218, such as for accessing a storage for downloading the package 206 containing package files 220 for installation to the target container 116. The service container 118, for instance, may include a package manager 130 process as one of the service container's processes 128. In one aspect, the package manager 130 is operable to manage different package installation actions such as download (which is optional) and execution of package files 220. The package manager 130, for instance, may download and unpack the package files 220, copy the package files 220 to the container file system 126, and then initiate package scripts which in turn may start execution of a binary file from the target container file system 126 for package installation. In another one exemplary aspect of the scenario, the package files downloading, unpacking, copying and\or script execution may be omitted, i.e., all or any of these steps are not performed. In the scenario 200c, to avoid potential security issues (e.g., exploits), a host process 112 does not execute files from the container file system 126.

Figure 2D:
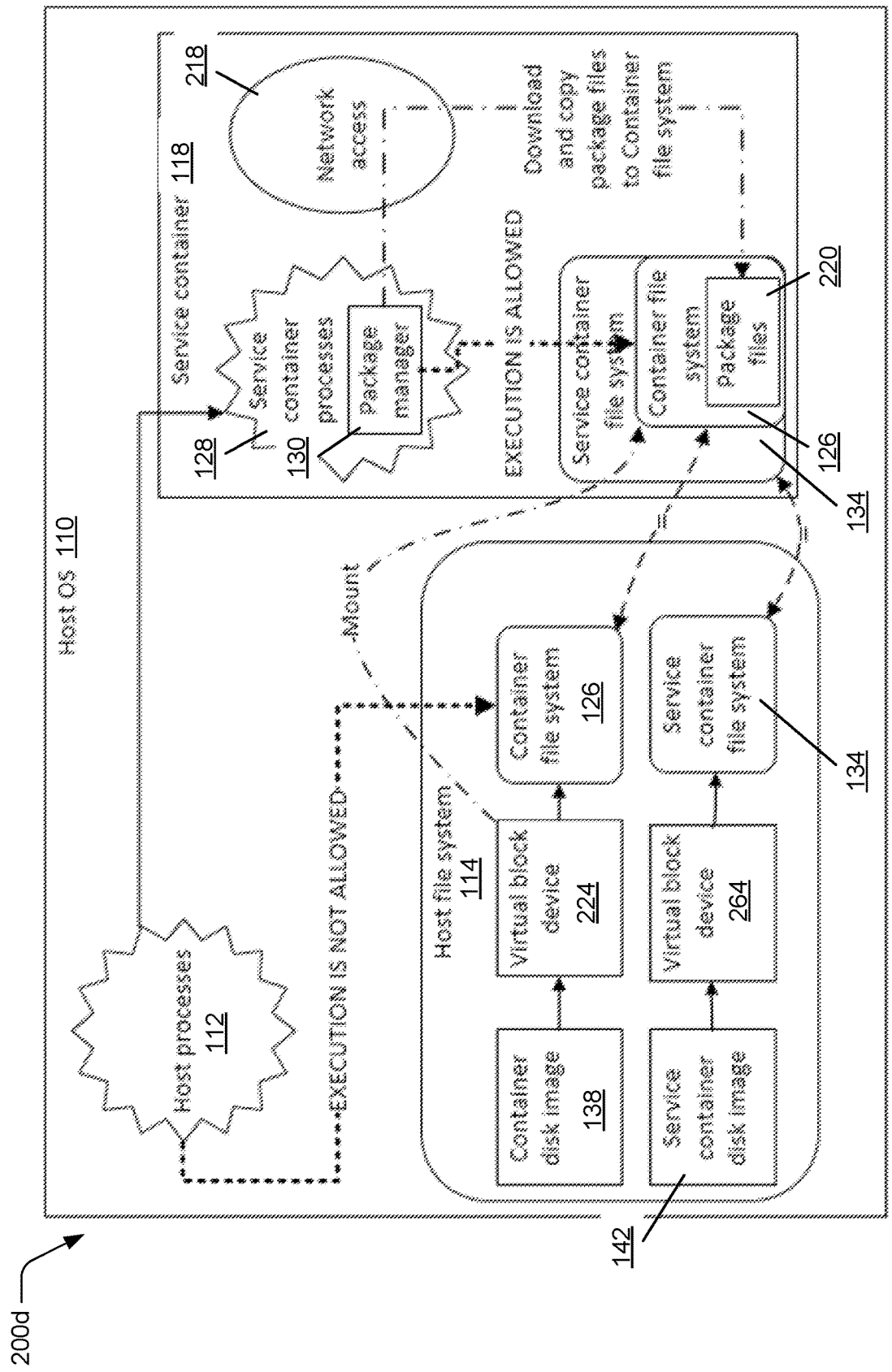
FIG. 2d depicts an example scenario in case where there may be a need to update a stopped container.

FIG. 2d depicts a scenario 200d where there may be a need to update a stopped container. In one aspect, this approach may be applied to a container in any state (stopped, running, error, etc.). In the scenario 200d the target container 116 may be stopped. In such case, the host system 102 will not have a running container 116 (as it was in the scenario 200c). In such a scenario the target container 116 is not running, but the host OS 110 still has access to the container disk image 138 and/or the container file system 126 from within the host file system 114. Accordingly, the package files 220 can still be installed into the target container 116 even though the container is not running. To accommodate this scenario, an available option is to mount the container disk image 138 (which includes the container file system 126) into the service container 118. In one exemplary aspect, to provide service container 118 access to the container file system 126, the host OS 110 (e.g., via the container management module 120) can create a virtual block device on the host system 102 from the container disk image 138, and/or mount the block device into the service container 118. While this particular exemplary aspect illustrates use of the virtual block device 224, other examples do not utilize the virtual block device 224 and thus the virtual block device 224 is optional. Accordingly, the service container 118 will have access to the container file system 126 that was stored in the container disk image 138. Package installation can then be performed by a service container process running inside of the service container 118 using the accessible container file system 126, as described throughout this disclosure. In one aspect, the host file system 114 may optionally contain virtual block devices (224 for the target container and 264 for the service container), which may be created from the corresponding container disk images (e.g., 138 for the target container and 142 for the service container).

Figure 3A:
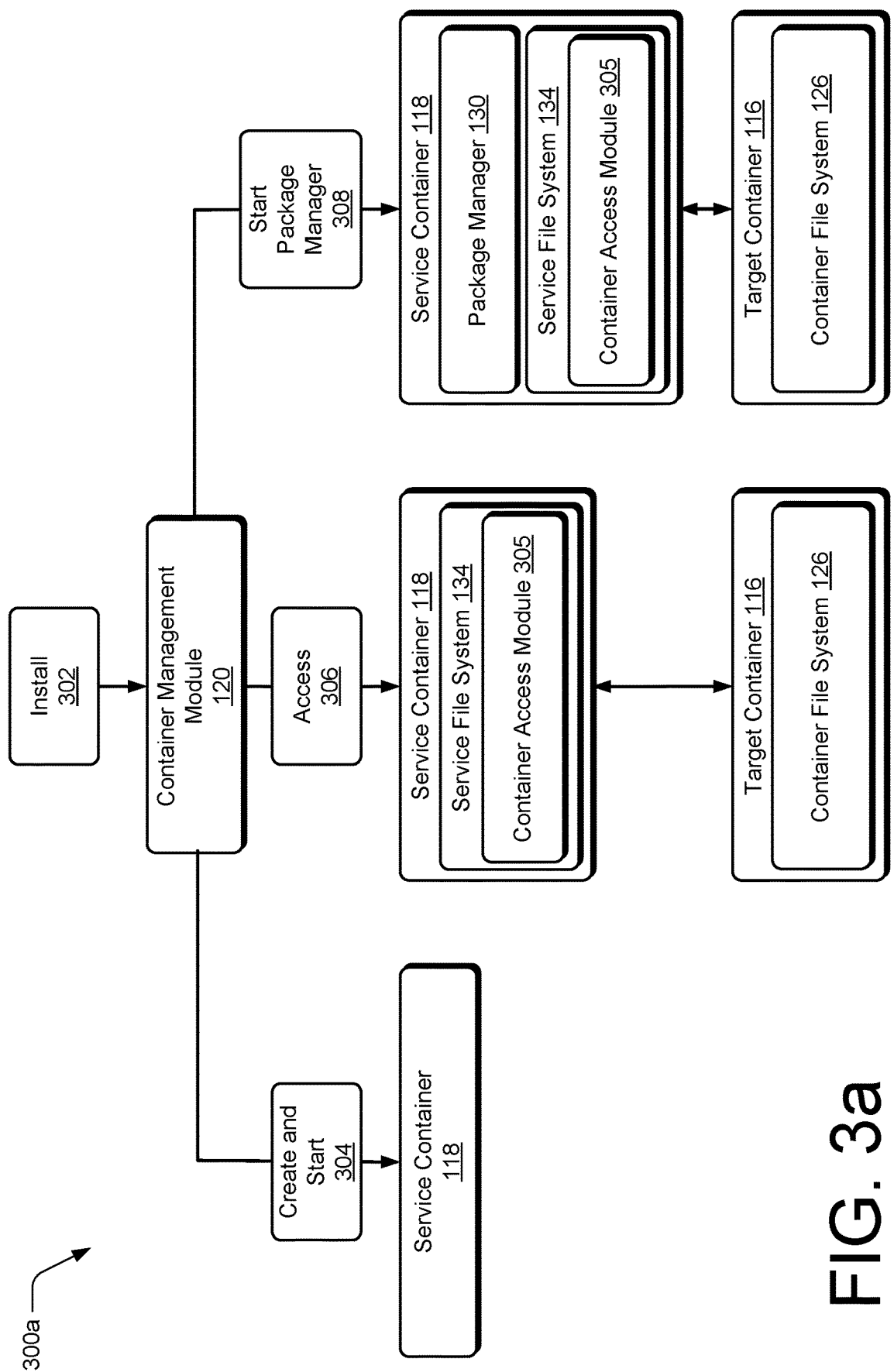
FIG. 3a depicts an example scenario illustrating exemplary aspects of secure package installation into a target container.

FIG. 3a depicts an example scenario 300a illustrating exemplary aspects of secure package installation into a target container. The scenario 300a, for example, depicts an example aspect for initiating package installation on the target container 116.

In the scenario 300a, the container management module 120 receives an install request 302 to install a package into the target container 116. Generally, the install request 302 can be initiated in response to various events, such as request (e.g., from the host OS, from a target container process, from a user of the target container, from an administrator of the host, from a user, and/or the host system 102) to install a package 206 (e.g., installation of an application, update of a service, remove/uninstall of a daemon and so forth) into the target container 116.

Accordingly, the container management module 120 executes a "create and start action 304" to start (and, in some exemplary aspects, create and start) the service container 118. The container management module 120 may create the service container 118 in various ways, such as from a preexisting service container template, a snapshot of a service container, utilizing a restore from checkpoint operation on an image of a preprepared service container, and so forth. In one aspect, the container management module 120 may initiate various actions in conjunction with the create and start 304, such as setting up network access to the service container 118 to the network, starting and/or configuring the package manager 130, providing access to the target container file system 126, and so forth. In one exemplary aspect, providing access to the target container file system 126 may include mounting to the service container 118 a block device created from the container disk image 138.

In one aspect, the container management module 120 also performs an access "action 306" to enable the service container 118 to access the container file system 126 of the target container 116. In one exemplary aspect, this may be done by initiating a container access module 305 for adding the container file system 126 to the service container resources 132 available to the service container 118. In the scenario 300a, the container access module 305 generally represents an access technique for granting the service container file system 134 access to the container file system 126.

A variety of different options are available for enabling the service container 118 to access the container file system 126, examples of which are detailed below.

The container management module 120 also performs a package manager "start action 308" to start and/or configure execution of the package manager 130 process in the service container 118. Generally, this enables the package manager 130 to execute in the service container 118 (e.g., as a process in context of the service container 118) further actions as part of installing a package to the target container 116.

Figure 3B:
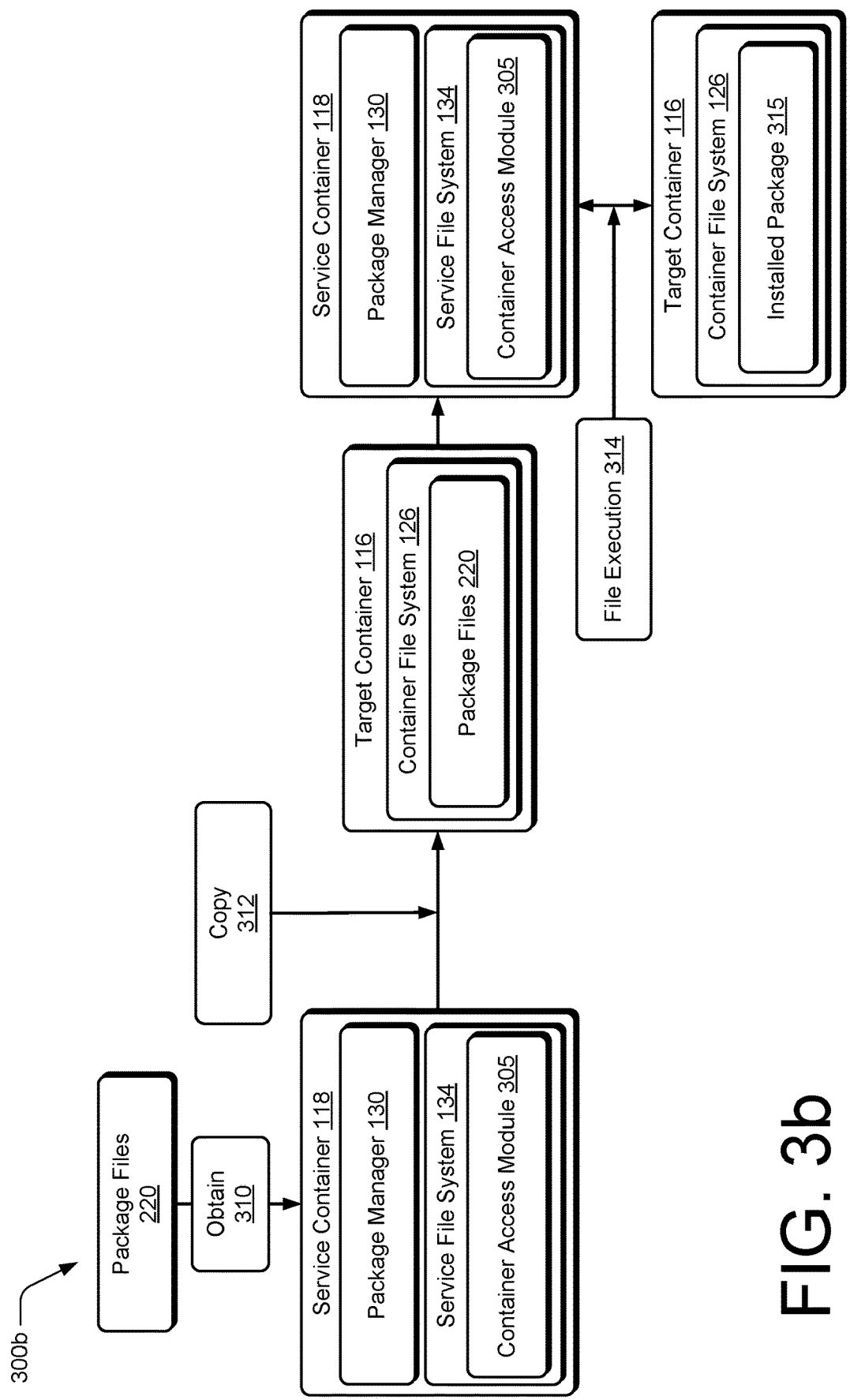
FIG. 3b depicts an example scenario illustrating further exemplary aspects of secure package installation into a target container.

FIG. 3b depicts an example scenario 300b illustrating further exemplary aspects of secure package installation into a target container. In the scenario 300b the package manager 130 performs an "obtain action 310" (which is optional and is not needed in case if the package is already available to the package manager 130) to obtain a package 206 from a package source 104, such as, for example, the network package source. In one exemplary aspect, the package manager 130, for instance, can download the package 206 over a network connection between the host system 102 and the network package source. In at least one exemplary aspect, the package manager 130, for instance, can obtain the package 206 from a local storage on the host system 102.

In the scenario 300b the package manager 130 performs a "copy action 312" (which is optional and is not needed in case if the package files are already on the target container file system) to copy package files 220 from the package 206 to the container file system 126, e.g., via the container access module 305. In one exemplary aspect, the container access module 305 provides an access provisioning technique for enabling the service container 118 to access the container file system 126, such as, for example, to write data to and read data from the container file system 126. For example, in at least one exemplary aspect, a mount technique is utilized to enable the service container 118 to access the container file system 126.

Further, in the scenario 300b the package manager 130 performs an "execution step 314" to perform execution of a file from the package files 220 (or a file from the target container file system) from within the context of the service container 118. In one exemplary aspect, the execution 314 can include various actions, such as running script files from the package files 220 to install, update, set up, configure and/or remove applications on the target container 116, to perform maintenance of the target container 116, and/or run binary files (or script files, or any executable files) obtained from the container file system 126, and so forth. In at least one exemplary aspect, the file execution 314 of the package files 220 are needed to install the package 206 into the target container 116 and to the target container file system 126 (the installed package is shown as 315). In some exemplary aspects, the installed package 315 can take various forms, such as a new application (or package, service, daemon, driver, module, etc.) installed on the target container 116, an update or upgrade to an existing application, setting up, management, removal of an existing application, and so forth.

In at least some exemplary aspects, performing actions pertaining to packages and/or applications (e.g., installation, updates, upgrades, removal, setting up, management, deinstallation, reconfiguration, or etc.) into target containers may also involve additional actions, which can be performed inside of a target container, e.g., such as, for example, starting or restarting a service corresponding to the application being updated in the target container. Such additional actions may involve creation or restart of a process inside of a target container. For example, the package manager 130 running a service container 118 may need to create a process inside of a target container 116. However, in at least some exemplary aspects, processes running in one container are unable to create processes in other containers. To address this, host processes 112 (e.g., Container Management Module 120) are able to create processes in target containers (e.g., using a container API). Accordingly, a service container 118 is able to query a host process 112 to create a process in a target container. Thus, a process (e.g., a daemon) running on the host operating system and outside of the target container and outside of the temporary service container, upon a request from the temporary service container can execute a command into a target container. In one aspect, the process may be a Container Management Module 120 process or a Package Manager 130 process. In one aspect, for example, a daemon may be running on the host system 102. The daemon listens to requests (or commands, e.g., sent via unix socket or any other communication channel) from the service container 118 (or from several service containers each for a separate target container), checks the safety of a request/command (e.g., only some types of requests/commands are allowed) and executes the request/command, e.g., using a container API. The daemon, for instance, exports the container API to a service container 118.

In one exemplary aspect, failure of installation of the package 206 into the target container 116 is detected and handled. For instance, an installation timer maintained by the container management module 120 (or by host, or by service container, or by target container, etc.) may elapse (which indicates that the installation process hanged on or a problem occurred) before installation of the package 206 is completed, and thus the container management module 120 may terminate and delete the service container 118. Deletion of the service container 118 after completion of the installation or upon a timer (wherein the time may be fixed, or depend on parameters of the host system, the system load, parameters of target container, and/or parameters of the package, number of packages or package files, etc.) further secures the host OS from a threat of exploits.

Figure 3C:
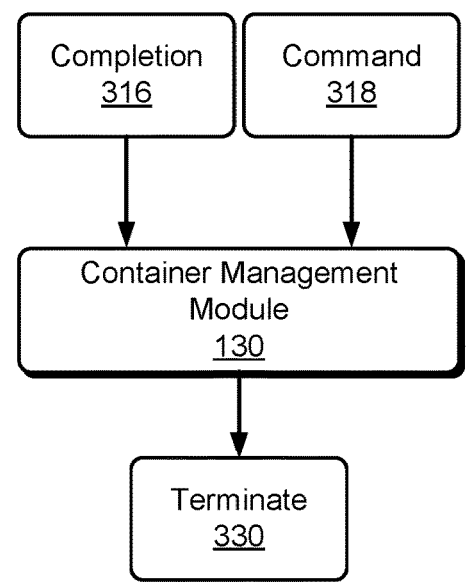
FIG. 3c depicts an example scenario depicting termination of a service container.

FIG. 3c depicts an example scenario 300c depicting termination of a service container. The scenario 300c includes at least two options for terminating the service container 118, includes a completion event 316 and a command event 318. The completion event 316, for instance, represents an indication that installation of the package 206 to the target container 116 is completed (e.g., succeeded, or an error occurred and the installation finished unsuccessfully; in the latter case the package manager 130 may additionally and optionally perform actions to revert changes back). The command event 318 represents a command (e.g., from the host OS 110 or from the service container 118 itself, or even from a target container 116, e.g., if a user of target container asked for abort installation) to terminate the service container 118 and/or to stop/revert back installation, etc. In at least one exemplary aspect, the command event 318 occurs in response to a timer elapsing, such as an installation timer maintained by the host operating system 110.

Accordingly, in response to the completion event 316 and/or the command event 318 the container management module 120 initiates a termination action 330 to stop execution of the service container 118 and, additionally in some exemplary aspects, delete the service container 118 from the host system 102. In one exemplary aspect, this causes the container file system 126 to be automatically unmounted from the service file system 134.

Having discussed example details of the techniques for secure package installation into a target container, consider now some example procedures to illustrate additional exemplary aspects of the techniques.

Example Procedures

This section describes example procedures for secure package installation into a target container in one or more exemplary aspects. Exemplary aspects of the procedures may be implemented in hardware, firmware, or software, or a combination thereof. The procedures are shown as a set of blocks that specify operations performed by one or more devices and are not necessarily limited to the orders shown for performing the operations by the respective blocks. In at least some exemplary aspects the procedures are performed by a suitably configured set of devices, such as via the host system 102 and using exemplary aspects described in the scenarios above.

Figure 4:
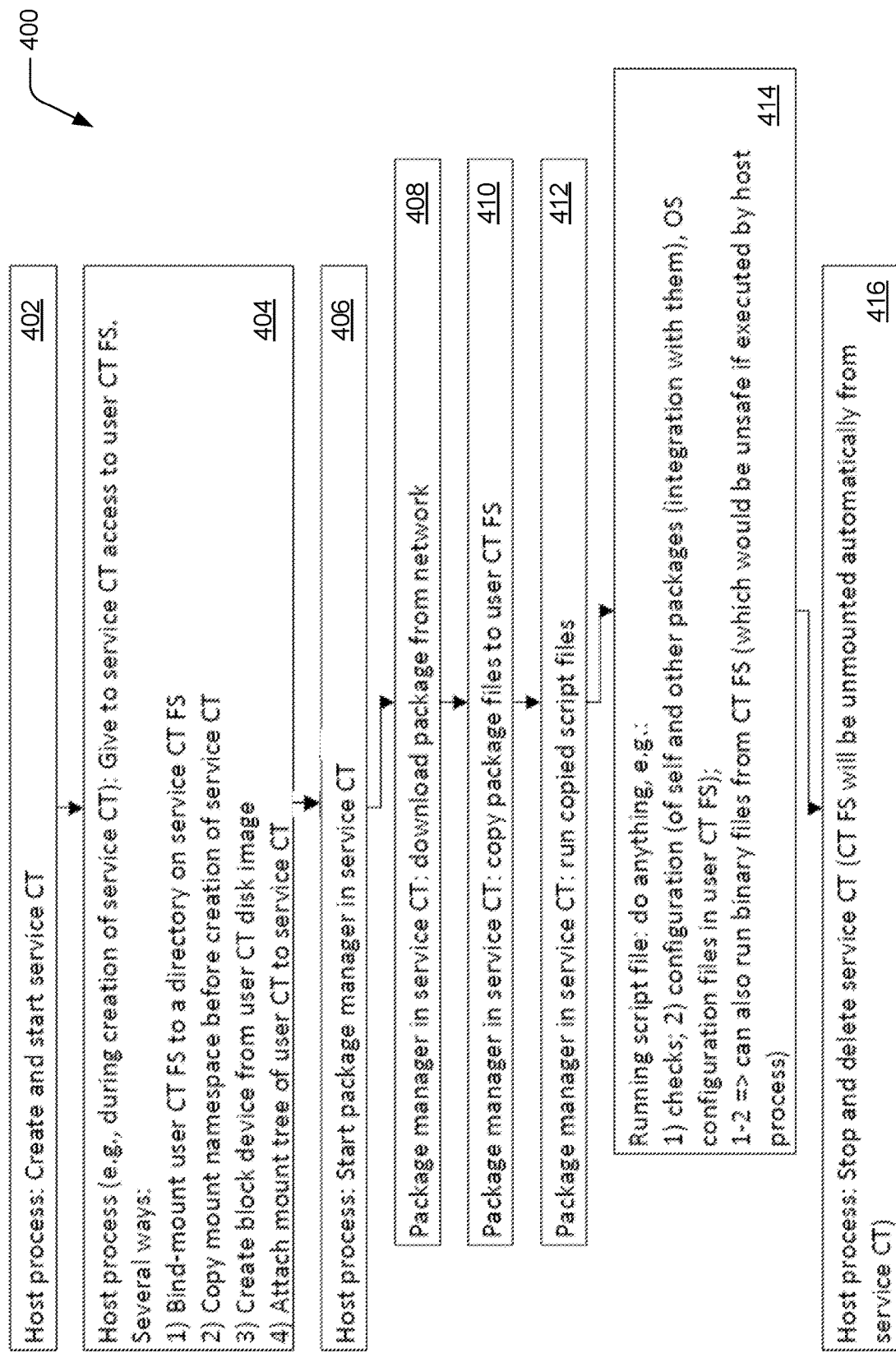
FIG. 4 depicts an example procedure for secure package installation into a target container.

FIG. 4 depicts an example procedure 400 for secure package installation into a target container. An installation of a package may comprise installation, update, upgrade, removal, set up, applying, management, deinstallation, configuration, reconfiguration, and/or etc. of an application, package, service, daemon, driver, module, and/or etc. Step 402 creates and/or starts a service container. For instance, a host process 112 (e.g., the container management module 120) instantiates (e.g., starts, creates and starts, or restores from a checkpoint, etc.) the service container 118. Creating and starting a service container may optionally involve: creating a service container 118 from a template, a snapshot, or a check-point-restore image of an already prepared service container; setting up network access in service container 118; setting up package manager 130 for installation of the packages for the target container 116; and performing any actions needed to provide to the service container 118 an access to the file system 126 of the target container 116 (e.g., by mounting to the service container 118 a block device created from the service container disk image 142, or by any other technique described throughout the disclosure).

Step 404 (for example, it may be performed during creation of a service container, just after the service container was created, etc.; may be done by host process, or with help of a process(es) inside of the service container, etc.) shows providing for the service container 118 access to a target container file system 126. In one exemplary aspect, the host OS 110, for instance, adds the container file system 126 to the service container resources 132. Providing for the service container 118 access to the target container file system 126 can in different exemplary aspects, be done in different ways, such as:

1) One option called on the figure "Bind-mount target CT FS to a directory on service CT FS" may be to add a directory on host file system 114 where the target container file system 126 resides (e.g., container root directory in the example of Linux), into the resources of the service container 118. E.g., this can be done using bind-mounts in case of Unix based OS. For instance, the container file system 126 is bind-mounted to a directory on the service file system 134.

2) Another option, called on the figure "Copy mount namespace before creation of service container" may include creation and setting up mount namespace of the service container, during service container creation, so that it includes mounts from mount namespace of the target container. In one exemplary aspect, this is done by copying the mounts, and may be achieved by:
  a) Entering into and copying the mount namespace of the target container. However, do not execute any files from the target container file system at this step because the process is not yet in the context of any container and thus execution of files may be able to access some host resources 108. During copying, a new mount namespace can be created and the process will leave the mount namespace of the target container and enter the new mount namespace. The new mount namespace will contain mounts and file systems that are in the mount namespace of the target container.
  b) Making mounts in the new mount namespace independent from mounts in the mount namespace of the target container. In one exemplary aspect, for example, in case of Linux OS, this may be done, e.g., by making mounts in the new mount namespace private to avoid propagation.
  c) Mounting a block device created from a disk image of the service container into a new directory in the new mount namespace to create service container file system.
  d) Setting up mounts and directories in the new mount namespace so that the new directory was a root directory of the service container being created, and so that service container file system includes target container file system. In one aspect, this can be done, for instance, by creating a subdirectory and changing the root mount of the process (e.g., by pivot_root( ) system call in the example of Linux) by putting the target container's root mount into the subdirectory and making the new directory with the service container file system to be the root mount of the mount namespace.

Accordingly, the service container will have not only a target container root filesystem, but also all encapsulated mounts of the target container mount namespace.

3) Yet another option, called on the figure as "Create block device from user CT disk image" may include mounting a block device created from a target container disk image into the service container.

4) Yet another option, called on the figure as "Attach mount tree of user container to service container" may be to attach a copy of mount tree of the target container to mount tree of the service container. In at least one exemplary aspect, a mount tree of the target container is copied (e.g., using a file descriptor for root directory) and relocated as a subtree in the service container. For example, in one aspect, copying and relocation may be performed by corresponding system calls of the host OS (e.g., by open_tree( ) and move_mount( ) in the example where the host OS is Linus or alike).

Step 406 starts package manager in service container. A host process 112, for instance, may start the package manager 130 in the service container 118.

Step 408 is optional and obtains a package, e.g., downloads a package from network, if needed (e.g., if the package is not yet downloaded by a host process or by target container, or is not available locally, or etc.). In one exemplary aspect, the package manager 130, for instance, downloads a package from a network resource.

Step 410 is also optional in some exemplary aspects and copies package files to the target container file system. In some exemplary aspects, this step may be omitted if target container FS already has such files, e.g., if they were put there by host OS or by a target container process. In some another exemplary aspects, the package manager 130 in the service container 118, for instance, copies package files to the target container file system 126 (e.g., to the bind-mounted target container's root directory in case if bind-mount (see option 1) above) was used to give to the service container an access to the target container file system). In one exemplary aspect, this step also includes unpacking the package files from the package.

Step 412 runs script (and/or, in some exemplary aspects, binary) files. The package manager 130 in the service container 118, for instance, initiates execution of a script file from the package files 220 (e.g., those copied to the target container file system 126 at previous step). In one exemplary aspect, it may involve changing root directory of a process to target container's root directory and starting needed scripts from the target container's root directory. In one exemplary aspect, this may additionally cause creation of a new process in the service container executing the script file.

Step 414 executes the script files. For instance, executing of the script files can perform actions such as:
  a) checks for status of the target container, packages already installed un the target container, and/or the package; and
  b) configuration of: target container, the package and/or other packages (e.g., integration with them); and/or OS configuration files in target container file system.

Both a) and b) may also run (start execution) of a binary (or script, etc.) file from target container file system 126. In such case, the execution is performed from a context of the service container (for example, by a service container's process, which has access only to a limited set of resources available for the service container and does not have access to any other resources on the host system). Thus, the execution of files from the target container file system 126 in the service container 118 is safe, while the execution of files from the target container file system 127 would be potentially unsafe if performed by a host process.

Step 416 stops and deletes service container. A host process, for instance, stops and/or deletes the service container 118. Thus, in one aspect, the target container file system 126 will be unmounted automatically from the service container 118.

Accordingly, in exemplary aspects where the method 400 is successfully performed, a package will be installed on the target container 116 and changes specified will be applied to the target container 116.

Figure 5:
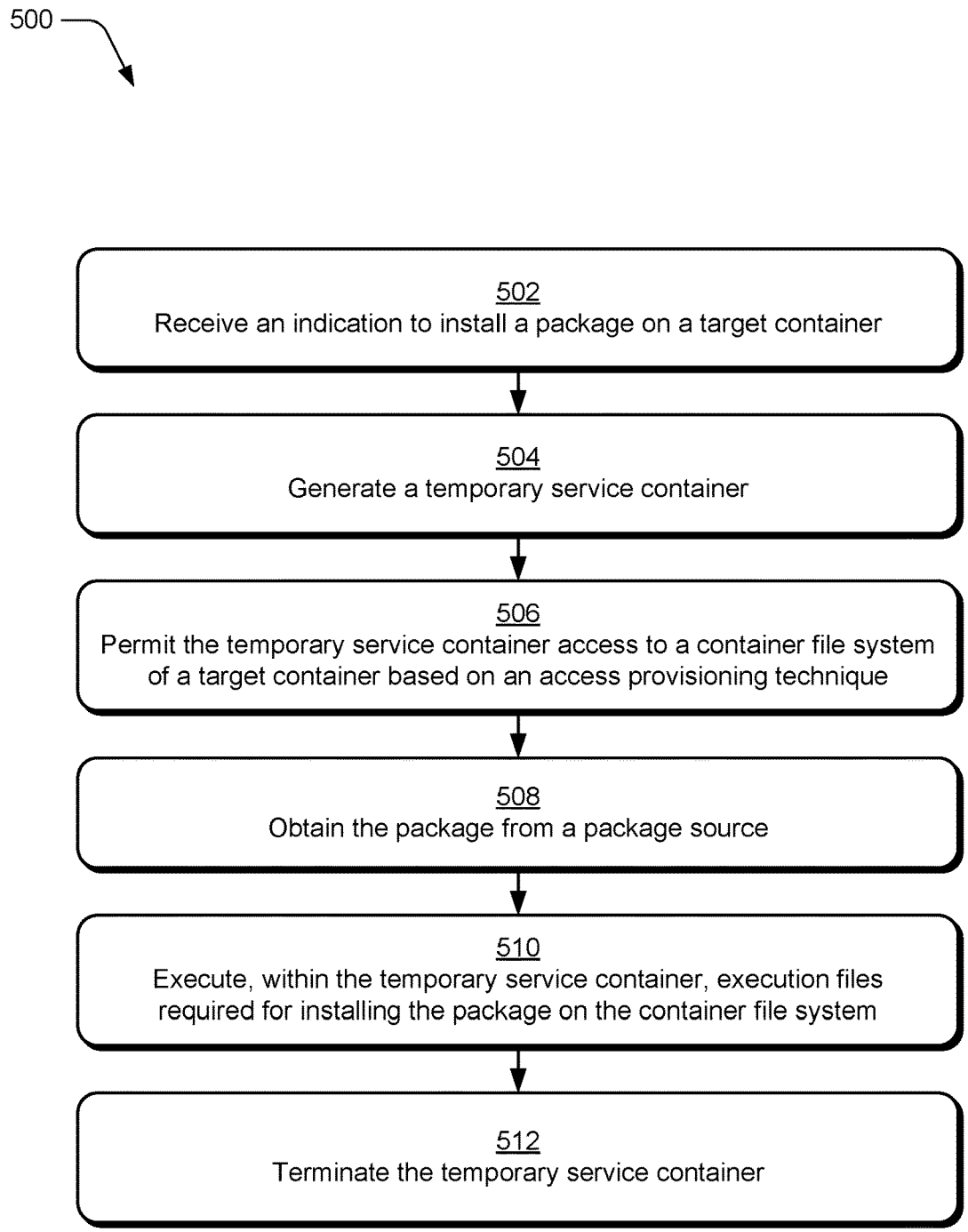
FIG. 5 depicts an example procedure for secure package installation into a target container.

FIG. 5 depicts an example procedure 500 for secure package installation into a target container. In at least one exemplary aspect, the method involves performing the following steps, on a computing device including a host operating system and at least one processor to execute the operations of the method.

Step 502 receives an indication to install a package on a target container. The container management module 120, for example, receives a request and/or a command to install a package 206 on the target container 116.

Step 504 generates a temporary service container. The container management module 120, for example, generates the service container 118 with the temporary service container 118 being located within the host OS 110.

Step 506 permits the temporary service container access to a target container file system of a target container based on an access provisioning technique. The container management module 120, for example, in one aspect, uses the container access module 305 to the service container 118 which enables the service container file system 134 to access the container file system 126.

In some aspects, the access provisioning technique (e.g., provided by the container access module 305) can be performed in various ways, including any of the following:

(1) Provisioning, via a mounting mechanism, a directory within the host file system 114 of the host system 102 into the service container resources 132 of the service container 118. In at least one exemplary aspect, the service container resources 132 include the service file system 134.

(2) Generating a service container mount namespace configured to provide the service container 118 access to the target container 116. The service container mount namespace, for instance, includes a file system mount configured to permit the service container file system access to the target container file system 126 mounted within the service container file system 134. In at least one exemplary aspect, the service container 118 includes a mount namespace of the target container 116. A detailed method for performing this technique is provided below.

(3) Mounting a block device configured to interface with the target container disk image to the service container.

(4) Attaching a copy of a mount tree of the target container 116 to a mount tree of the service container 118. For instance, copy a mount tree of the target container 116 (e.g., using a file descriptor for root directory) and relocate it as a subtree in the service container 118.

Step 508 is optional and obtains the package from a package source (e.g., package source 104). The package manager 130, for example, retrieves package files 220 from a package source 104 such as the network package source, local storage, etc. In at least one exemplary aspect, obtaining the package includes downloading a subset of package files of the set of package files along with package file dependencies to a target container files system mounted within the service container file system 134.

Step 510 executes, within the temporary service container, execution files required for installing the package on the target container file system. The package manager 130, for example, causes execution of package files within the service container 118. As mentioned above, the target container file system 126 is accessible by the service container file system of the service container 118. In at least one exemplary aspect, execution of the execution files causes the package to be installed on the target container 116 to cause a modification to the target container 116 such as installation, an update, an upgrade, a reconfiguration, a removal, setup of a application, service, daemon, module, and so forth.

Step 512 terminates the temporary service container. The container management module 120, for example, terminates the service container 118 in response to an indication of completion of a package installation to the target container, and/or a command from the host OS 110 (or by any user, or the target or the service container) to terminate the service container 118.

Figure 6:
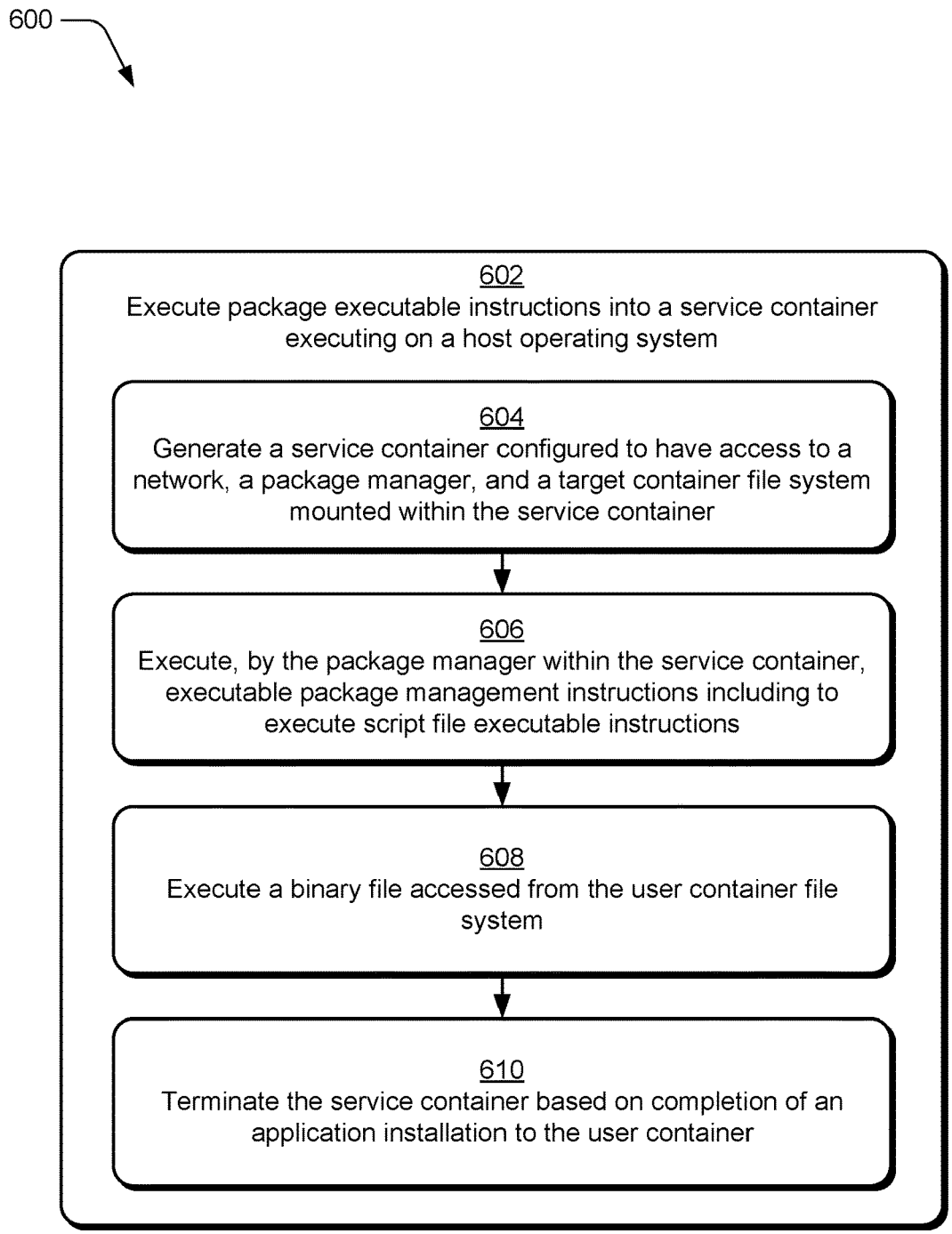
FIG. 6 depicts an example procedure for secure package installation into a target container.

FIG. 6 depicts an example procedure 600 for secure package installation into a target container. In one aspect, the procedure 600, for example, may be performed additionally or alternatively to the procedures 300a, 300b, 300c to enable secure package installation into a target container.

Step 602 executes package executable instructions (e.g., a binary file, a script, etc.) into a service container executing on a host operating system. In one exemplary aspect, the container management module 120 of the host OS 110 and the package manager 130, for instance, initiate and manage execution of instructions associated with a package 206 for installation of a package into the target container 116. To perform execution of the package executable instructions includes the following steps may be performed:

Step 604 generates a service container configured to have access to at least one of: a network, a package manager, and a target container file system mounted within the service container. The container management module 120, for instance, generates the service container 118 including a package manager 130 process. Further, the container management module 120 enables the service container 118 to access the target container file system 126. Example ways for enabling such access are discussed above and include various mounting techniques.

Step 606 executes, e.g., by the package manager, within the service container, executable package management instructions. The package manager 130, for example, executes instructions obtained from package files 220 and within the context of the service container 118. Execution of the executable package management instructions, for example, may include execution script file executable instructions. In at least one exemplary aspect, executing the script file executable instructions causes execution of a check operation and/or an operation to configure the package and/or other packages within the container file system 126 accessible by the service file system 134.

Step 608 executes a binary file accessible from the target container file system. In one aspect, execution of the script file executable instructions, for example, triggers the process inside of the service container, e.g., package manager 130, to retrieve a binary file from the container file system 126 and execute the binary file. In at least one exemplary aspect, the execution of executable operations corresponding to the binary file is configured to access the service container resources 132 which include resources within the service container 118 and the container file system 126. In at least one exemplary aspect, execution of the script file executable instructions and execution of the binary file executable instructions causes installation of an application from package files 220 to the target container 116.

Step 610 terminates the service container based on completion of a package (e.g., application) installation to the target container. The container management module 120 terminates the service container 118, for instance, based on package have been installed, completion of installation (e.g., after execution of the script file executable instructions and execution of the binary file executable instructions) on the target container 116, or based on a command of the host OS 110, service container, or a timeout.

Figure 7:
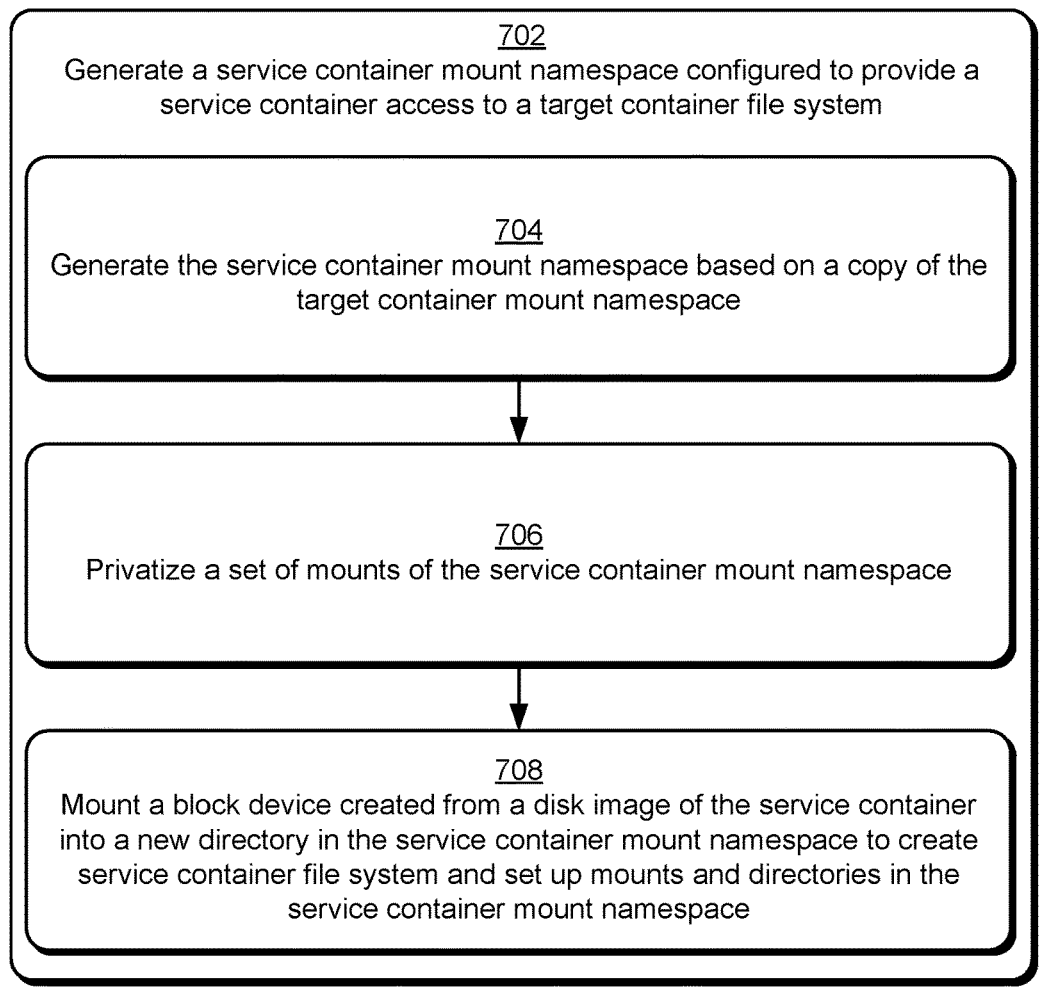
FIG. 7 depicts an example procedure for enabling a service container to access a file system of a target container for package installation.

FIG. 7 depicts an example procedure 700 for enabling a service container to access a file system of a target container for package installation. In one aspect, the procedure 700, for example, may be performed in conjunction with the procedures discussed above or be an alternative to other access provisioning techniques discussed above.

Step 702 generates a service container mount namespace configured to provide a temporary service container access to a target container file system. A host process, e.g., the container management module 120 or package manager 130, for example, generates the service container mount namespace to including a file system mount configured to permit the service container file system 134 access to the target container file system 126. In one aspect, the service container 118, for instance, includes a copy of mount namespace of the target container 116. In at least one exemplary aspect, generating the service container mount namespace includes operations (e.g., performed by the container management module 120) of:

Step 704 accesses a target container mount namespace and copies the target container mount namespace. Generally, the target container mount namespace copy is configured to replicate a target container mount namespace and render the container file system 126 accessible via private mounts configured to inhibit event propagation.

In one aspect, the service container mount namespace, for instance, is based on the copy of the target container mount namespace and includes a set of mounts and file systems corresponding to the target container mount namespace. The service container mount namespace for the service container 118, for instance, is generated to include a set of mounts and file systems corresponding to the target container mount namespace of the target container 116. The container management module 120, for example, generates a service container mount namespace for the service container 118 based on a copy of the target container mount namespace of the target container 116.

Step 706 privatizes the set of mounts of the service container mount namespace. For instance, the container management module 120, the package manager 130 or a service container process, implements a privatization operation (e.g., make the mounts to become private, e.g., not shared) such that the private set of mounts of the service container inhibit propagation of service container mount events to the target container mount namespace and vice versa.

Step 708 mounts a block device created from a disk image of the service container into a new directory in the created mount namespace to create service container file system, sets up mounts and directories in the created mount namespace, for example, so that the new directory was a root directory of the service container being created, and so that service container file system includes a target container file system. The container management module 120 or a process of the service container, for example, creates a subdirectory and changes the root mount of the process (e.g., by pivot_root( ) system call in case of Linux) by putting the target container's root mount into the subdirectory and making the new directory with the service container file system to be the root mount of the mount namespace. Generally, this enables the service container to have not only the container root filesystem, but also all encapsulated mounts of the target container mount namespace.

Thus, the service container 118 is able to access the container file system 126 of the target container for package installation utilizing the mounted service file system 134.

Accordingly, the described techniques can be employed to provide secure and efficient ways for installing packages into containers. Having described example procedures in accordance with one or more exemplary aspects, consider now an example system and device that can be utilized in the various techniques described herein.

Example System and Device

Figure 8:
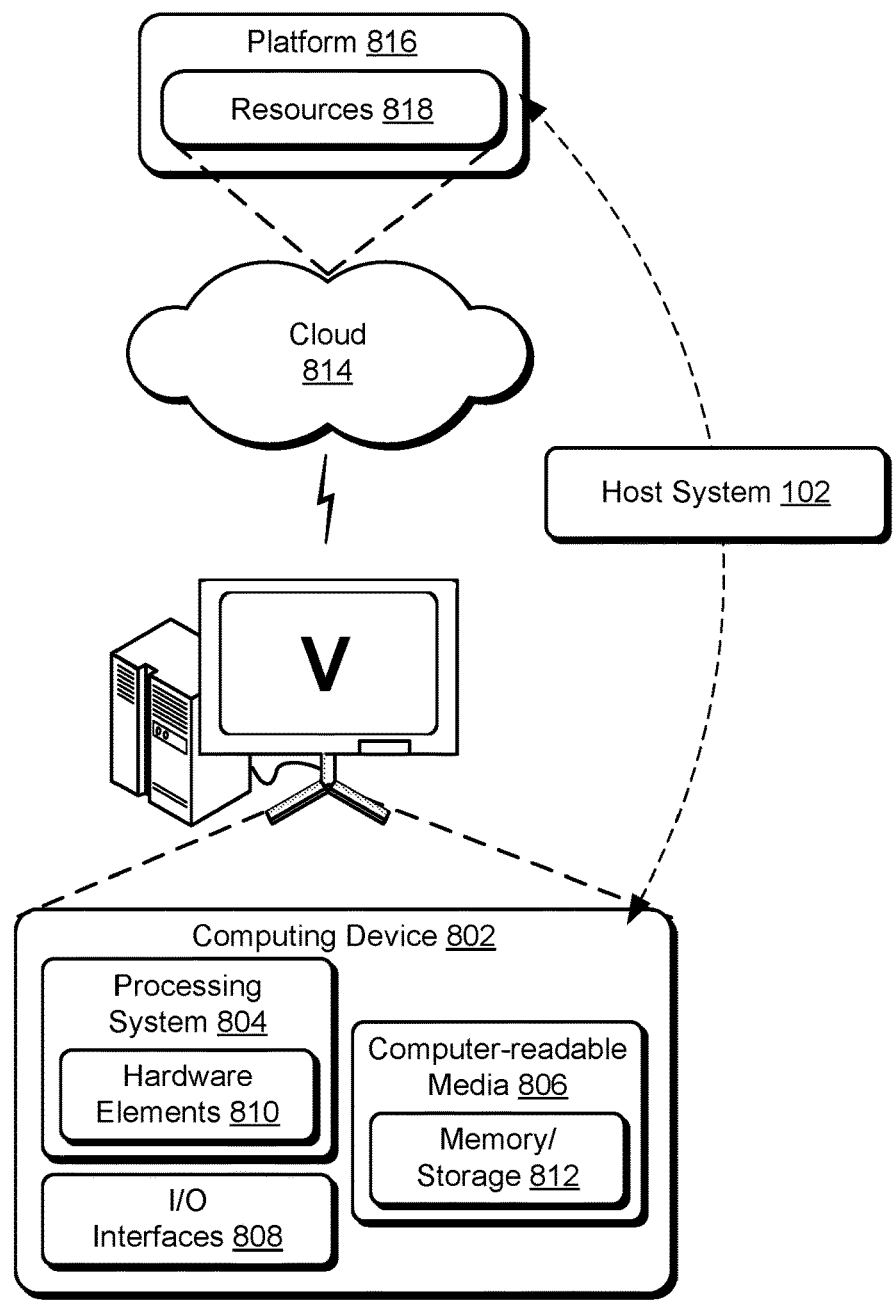
FIG. 8 illustrates an example system including various components of an example device that can be utilized as any type of computing device as described and/or utilized with reference to FIGS. 1-7 to implement exemplary aspects of the techniques described herein.

FIG. 8 illustrates an example system generally at 800 that includes an example computing device 802 that is representative of one or more computing systems and/or devices that may implement the various techniques described herein. This is illustrated through inclusion of the host system 102. The computing device 802 may be, for example, a server of a service provider, a device associated with a client (e.g., a client device), an on-chip system, and/or any other suitable computing device or computing system.

The example computing device 802 as illustrated includes a processing system 804, one or more computer-readable media 806, and one or more I/O interfaces 808 that are communicatively coupled, one to another. Although not shown, the computing device 802 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 804 is representative of functionality to perform one or more operations using hardware. Accordingly, the processing system 804 is illustrated as including hardware elements 810 that may be configured as processors, functional blocks, and so forth. This may include implementation in hardware as an application specific integrated circuit or other logic device formed using one or more semiconductors. The hardware elements 810 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 806 is illustrated as including memory/storage 812. The memory/storage 812 represents memory/storage capacity associated with one or more computer-readable media. The memory/storage component 812 may include volatile media (such as random access memory (RAM)) and/or nonvolatile media (such as read only memory (ROM), Flash memory, optical disks, magnetic disks, and so forth). The memory/storage component 812 may include fixed media (e.g., RAM, ROM, a fixed hard drive, and so on) as well as removable media (e.g., Flash memory, a removable hard drive, an optical disc, and so forth). The computer-readable media 806 may be configured in a variety of other ways as further described below.

Input/output interface(s) 808 are representative of functionality to allow a user to enter commands and information to computing device 802, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 802 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," "node," "engine," and "component" as used herein generally represent software, firmware, hardware, or a combination thereof. The features of the techniques described herein are platform-independent, meaning that the techniques may be performed on a variety of commercial computing platforms having a variety of processors.

An implementation of the described modules and techniques may be stored on or transmitted across some form of computer-readable media. The computer-readable media may include a variety of media that may be accessed by the computing device 802. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Computer-readable storage media do not include signals per se or transitory signals. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 802, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 810 and computer-readable media 806 are representative of modules, programmable device logic and/or fixed device logic implemented in a hardware form that may be employed in some embodiments to implement at least some exemplary aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 810. The computing device 802 may be configured to implement particular instructions and/or functions corresponding to the software and/or hardware modules. Accordingly, implementation of a module that is executable by the computing device 802 as software may be achieved at least partially in hardware, e.g., through use of computer-readable storage media and/or hardware elements 810 of the processing system 804. The instructions and/or functions may be executable/operable by one or more articles of manufacture (for example, one or more computing devices 802 and/or processing systems 804) to implement techniques, modules, and examples described herein.

The techniques described herein may be supported by various configurations of the computing device 802 and are not limited to the specific examples of the techniques described herein. This functionality may also be implemented all or in part through use of a distributed system, such as over a "cloud" 814 via a platform 816 as described below.

The cloud 814 includes and/or is representative of a platform 816 for resources 818. The platform 816 abstracts underlying functionality of hardware (e.g., servers) and software resources of the cloud 814. The resources 818 may include applications and/or data that can be utilized while computer processing is executed on servers that are remote from the computing device 802. Resources 818 can also include services provided over the Internet and/or through a subscriber network, such as a cellular or Wi-Fi network.

The platform 816 may abstract resources and functions to connect the computing device 802 with other computing devices. The platform 816 may also serve to abstract scaling of resources to provide a corresponding level of scale to encountered demand for the resources 818 that are implemented via the platform 816. Accordingly, in an interconnected device embodiment, implementation of functionality described herein may be distributed throughout the system 800. For example, the functionality may be implemented in part on the computing device 802 as well as via the platform 816 that abstracts the functionality of the cloud 814.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method, implemented by at least one computing device, for secure installing a package into a target container, the method comprising:
   generating a temporary service container in a host operating system;
   permitting the temporary service container access to a container file system of the target container;
   initiating a package manager to execute, within the temporary service container, one or more executable files located on the container file system of the target container and required for installing the package on the container file system of the target container, wherein the generating the temporary service container and/or the permitting the temporary service container access to a container file system of the target container further comprises mounting into the temporary service container a virtual block device created from a disk image of the target container; and
   terminating the temporary service container based on a completion of installing the package, or in response to a command of the host operating system or of the temporary service container.

2. The method of claim 1, wherein the container file system of the target container is accessible by a temporary service container file system of the temporary service container.

3. The method of claim 1, further comprising:
   accessing, by the package manager, a network comprising a set of package files; and
   downloading a subset of package files of the set of package files to the container file system.

4. The method of claim 1, further comprising:
   starting a package manager process within the temporary service container, wherein the package manager process is configured to install, create, delete, or change a set of package files within the container file system of the target container; and/or
   configured to start, within the temporary service container, execution of the one or more executable files, wherein the one or more executable files are located on the container file system of the target container.

5. The method of claim 1, wherein a process, running on the host operating system and outside of the target container and outside of the temporary service container, upon a request from the temporary service container executes a command into the target container.

6. The method of claim 1, wherein generating the temporary service container and/or permitting the temporary service container access to a container file system of the target container further comprises:
   creating and setting up a mount namespace of the temporary service container so that the mount namespace of the temporary service container includes a copy of at least one mount from a mount namespace of the target container.

7. The method of claim 1, wherein generating the temporary service container and/or permitting the temporary service container access to a container file system of the target container further comprises at least one of:
   mounting the container file system of the target container within a temporary service container file system of the temporary service container;
   bind-mounting a root directory of the container file system of the target container into a directory in a temporary service container file system of the temporary service container;
   getting a copy of a mount tree of the target container and relocating the copy as a subtree of a mount tree of the temporary service container; or
   creating a mount namespace of the temporary service container by copying a mount namespace of the target container, privatizing a set of mounts of the mount namespace of the temporary service container, mounting the temporary service container file system of the temporary service container into a new directory in the mount namespace of the temporary service container, and making the new directory to become a root directory of the mount namespace of the temporary service container simultaneously with moving a root directory of the container file system of the target container to a subdirectory of the new directory.

8. The method of claim 1, wherein generating the temporary service container and/or permitting the temporary service container access to a container file system of the target container further comprises:
   creating a copy of mount tree of the target container into a mount namespace of the temporary service container.

9. A system for secure installing a package into a target container comprising:
   one or more processors; and
   one or more storage devices comprising processor executable instructions that, responsive to execution by the one or more processors, cause the system to perform operations comprising:
   generating a temporary service container in a host operating system;
   permitting the temporary service container access to a container file system of the target container;
   mounting into the temporary service container a virtual block device created from a disk image of the target container,
   initiating a package manager to execute, within the temporary service container, one or more executable files located on the container file system of the target container and required for installing the package on the container file system of the target container; and
   terminating the temporary service container based on a completion of installing the package, or in response to a command of the host operating system or of the temporary service container.

10. The system of claim 9, wherein the container file system of the target container is accessible by a temporary service container file system of the temporary service container.

11. The system of claim 9, further comprising:
   accessing, by the package manager, a network comprising a set of package files; and
   downloading a subset of package files of the set of package files to the container file system.

12. The system of claim 9, wherein the temporary service container is generated based on at least one of: a template comprising temporary service container parameters, a snapshot of the temporary service container, or a restore image of a temporary service container.

13. The system of claim 9, further comprising:
   starting a package manager process within the temporary service container, wherein the package manager process is configured to install, create, delete, or change a set of package files within the container file system of the target container; and/or
   configured to start, within the temporary service container, execution of the one or more executable files, wherein the one or more executable files are located on the container file system of the target container.

14. The system of claim 9, wherein a process, running on the host operating system and outside of the target container and outside of the temporary service container, upon a request from the temporary service container executes a command into the target container.

15. The system of claim 9, wherein generating the temporary service container and/or permitting the temporary service container access to a container file system of the target container further comprises:
   creating and setting up a mount namespace of the temporary service container so that the mount namespace of the temporary service container includes a copy of at least one mount from a mount namespace of the target container.

16. The system of claim 9, wherein generating the temporary service container and/or permitting the temporary service container access to a container file system of the target container further comprises at least one of:
   mounting the container file system of the target container within a temporary service container file system of the temporary service container;
   bind-mounting a root directory of the container file system of the target container into a directory in a temporary service container file system of the temporary service container;
   getting a copy of a mount tree of the target container and relocating the copy as a subtree of a mount tree of the temporary service container; or
   creating a mount namespace of the temporary service container by copying a mount namespace of the target container, privatizing a set of mounts of the mount namespace of the temporary service container, mounting the temporary service container file system of the temporary service container into a new directory in the mount namespace of the temporary service container, and making the new directory to become a root directory of the mount namespace of the temporary service container simultaneously with moving a root directory of the container file system of the target container to a subdirectory of the new directory.

17. A method, implemented by at least one computing device, for executing package executable instructions as part of secure installing a package into a target container, the method comprising:
   generating a temporary service container, with a package manager mounted within the temporary service container and a target container file system mounted within the temporary service container;
   executing, by the package manager within the temporary service container, executable package management instructions for the package including to execute script file executable instructions;
   executing, based on execution of the script file executable instructions, a binary file accessed from the target container file system to cause installation of an application from the package to the target container via the target container file system;
   wherein the generating the temporary service container and/or permitting the temporary service container access to a container file system of the target container further comprises mounting into the temporary service container a virtual block device created from a disk image of the target container; and
   terminating the service container based on completion of installation of the application to the target container, or in response to a command of the host operating system or of the temporary service container.

* * * * *